United States Patent [19]
Finke

[11] 3,810,362
[45] May 14, 1974

[54] HYDRODYNAMIC TORQUE CONVERTER

[75] Inventor: Ernst-Guenter Finke, Steinheim-Kuepfendorf, Germany

[73] Assignee: Voith Getriebe KG, Heidenheim, Germany

[22] Filed: Apr. 25, 1973

[21] Appl. No.: 354,378

[30] Foreign Application Priority Data
May 6, 1972 Germany............................ 2222351

[52] U.S. Cl. ................................................. 60/362
[51] Int. Cl. ....................... F16d 33/00, F16h 41/00
[58] Field of Search ............ 60/341, 344, 345, 347, 60/361, 362

[56] References Cited
UNITED STATES PATENTS
2,102,635  12/1937  Lysholm et al. ..................... 60/362
2,613,503  10/1952  Syrovy ............................. 60/362 X
3,152,446  10/1964  Foerster et al.................... 60/345 X Primary Examiner—Edgar W. Geoghegan
Attorney, Agent, or Firm—Michael S. Striker

[57] ABSTRACT

A hydrodynamic torque converter which is installed between the engine and the change-speed transmission of a heavy-duty vehicle and wherein the casing which defines a fluid enclosure is rotatable independently of the pump, turbine and one or more stators but can be coupled to the pump by a friction clutch for normal operation of the torque converter. The turbine is rigid with the output member, the casing is rigid with the input member, and the stator or stators are mounted on a hollow stationary shaft by means of one or more freewheels which confine the stator or stators to rotation in a single direction. If the torque converter is to act as a brake, the operator engages a friction brake which connects the pump to a stationary housing whereby the turbine acts as the rotor of a brake. A further clutch and/or a freewheel is provided between the input member and the output member to insure that the engine which rotates the input member can participate in the braking action. The freewheel can act as a brake during parking; it prevents the output member from rotating at a speed which exceeds the speed of the input member.

19 Claims, 3 Drawing Figures

HYDRODYNAMIC TORQUE CONVERTER

BACKGROUND OF THE INVENTION

The present invention relates to hydrodynamic torque converters. More particularly, the invention relates to improvements in hydrodynamic torque converters which can be used for transmission of torque to the input element of a change-speed transmission in an automotive vehicle, such as a bulldozer, truck, tractor, fork lift truck or passenger car. Still more particularly, the invention relates to improvements in hydrodynamic torque converters of the type wherein the casing or shell which defines a fluid enclosure is rotatable independently of the turbine, pump and one or more stators and is rigid with the input member, wherein the pump is mounted for centrifugal flow of fluid therethrough, and wherein the pump can be coupled to the casing by means of a friction clutch.

U.S. Pat. No. 3,537,262 to Briski discloses a heavy-duty torque converter which can be used in trucks, tractors, bulldozers or analogous automotive vehicles and is installed between the engine and a change-speed transmission or another mechanical gear train wherein the transmission may be of that type whose ratio can be changed when the transmission transmits torque (power shift transmission) or of that type, which may only be changed over when the torque transmission is interrupted. The main purpose of the patented torque converter is to facilitate the shifting into different gears and/or to assist in starting of the vehicle. The friction clutch between the rotatable casing and the pump is designed to allow for selection of extremely low speeds during inching of the vehicle.

Heavy duty vehicles are normally equipped with a supplementary brake which should be subjected to minimal wear. For example such vehicles employ hydrodynamic brakes. A drawback of hydrodynamic brakes which need a host of auxiliaries, such as heat exchangers, regulators and/or others is their high cost and their requirement of space.

German Offenlegungsschrift No. 1,919,983 discloses a torque converter which can be used to transmit torque during normal operation (traction) as well as to participate in the braking action. The pump is rigid with the rotary input member of the torque converter and the input member can be directly coupled to the output member by means of a first friction clutch. A second friction clutch or a freewheel is provided to connect the turbine with the output member, and a friction brake is actuated when the operator desires to arrest the turbine. The torque converter of this German publication does not employ a friction clutch for coupling the pump to the input member. A drawback of the just described torque converter is that, when it is to be operated as a brake, the pump acts as the rotor of the brake and the turbine acts as a stator, i.e., the turbine must be disengaged from the output memeber (which is to be braked) and must be arrested by means of the friction brake. At the same time, the first friction clutch must be actuated to couple the pump with the output member so that the prime mover participates in the braking action by way of the pump. Consequently, the torque converter must employ a very large, bulky, strong and expensive friction brake as well as a large and expensive second friction clutch or freewheel because the torque increases substantially during transmission of forces from the pump to the turbine, especially when the turbine is at a standstill. The second friction clutch or the freewheel must transmit such high torque to the stationary housing during starting of the vehicle as well as during braking. The same holds true for the first friction clutch which can couple the input member directly to the output member because, when the vehicle is to be braked, this clutch must transmit torque which is being taken up by the torque converter as well as torque which is being taken up by the prime mover.

SUMMARY OF THE INVENTION

An object of the invention is to provide a relatively simple, compact and versatile hydrodynamic torque converter which can be used for transmission of torque to the change-speed transmission of an automotive vehicle and which can also serve as a means for producing a controllable braking action.

Another object of the invention is to provide a torque converter which is constructed and assembled in such a way that, when used as a means for braking the vehicle, it causes the prime mover for its input means to participate in the braking action.

A further object of the invention is to provide a torque converter which can operate properly with relatively small clutches and mechanical braking devices.

An additional object of the invention is to provide a compact torque converter of relatively small axial length which can be used with particular advantage for transmission of torque to the input element of a change-speed transmission in a heavy-duty vehicle, such as a truck, tractor, bulldozer, fork lift truck or the like but which is equally suited for use in passenger cars.

A further object of the invention is to provide novel and improved means for establishing and/or terminating driving connections between the rotary casing or shell and selected bladed components of a torque converter.

An ancillary object of the invention is to provide a novel and improved mounting for the stator and pump of a torque converter.

The invention is embodied in a hydrodynamic torque converter which comprises a shaft, flange or analogous rotary input means, a rotary casing which is rigid with the input means and defines a fluid enclosure, a pump mounted in the enclosure in such a way that it can rotate independently of the casing or vice versa, first clutch means which is preferably installed in the enclosure and is engageable to couple the pump to the casing for normal operation of the torque converter, a turbine which is mounted in the enclosure in such a way that it can rotate independently of the casing or vice versa, a shaft, flange, sleeve or analogous rotary output means which is rigid with the turbine, rotary stator means provided in the enclosure, a housing which includes hollow stationary supporting means for the stator means and surrounds the input and/or output means, mechanical brake means mounted in or on the housing and being operable to arrest the pump in disengaged condition of the first clutch means, and overrunning clutch means including one or more freewheels interposed between the stator means and the supporting means so that the stator means is confined to rotation in a single direction relative to the housing.

The first clutch means preferably comprises a friction clutch which is mounted in the enclosure, and the casing is preferably rotatable independently of the stator means. The vanes or blades of the pump are preferably positioned for substantially centrifugal flow of fluid through the pump during normal operation (traction), and the vanes or blades of the turbine are preferably positioned for substantially centripetal flow of fluid through the turbine likewise during normal operation of the torque converter.

The novel features which are considered as characteristic of the invention are set forth in particular in the appended claims. THe improved hydrodynamic torque converter itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
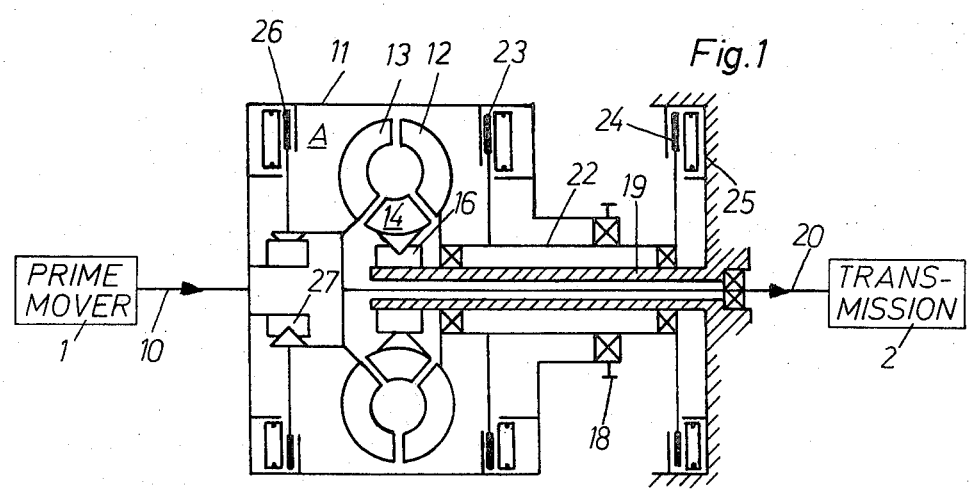
FIG. 1 is a diagrammatic axial sectional view of a hydrodynamic torque converter which embodies one form of the invention.

The hydrodynamic torque converter of FIG. 1 comprises a rotatable driving source or input member 10 and a rotatable output drive or output member 20 which is coaxial with the input member 10. The input member 10 is driven by an engine or another suitable prime mover 1 and is connected with a rotary shell or casing 11 which defines a fluid enclosure A for the bladed components of the torque converter, namely, for an impeller or pump 12, a turbine 13 and a stator 14. The pump 12 can rotate with as well as independently of the casing 11, and the turbine 13 is connected with the output member 20. When the output member 20 is to drive a change-speed transmission 2 in a truck, tractor or another automotive vehicle, the pump 12 is coupled to the casing 11 by a first friction clutch 23 which is installed in the enclosure A. The pump 12 is connected with a hollow shaft 22 which surrounds a hollow supporting shaft 19 for the stator 14. In accordance with a feature of the invention, the shaft 22 can be coupled to a stationary housing 25 (which is rigid with the supporting shaft 19) by means of a friction brake or pump brake 24. The brake 24 is engaged when the friction clutch 23 is disengaged, and the torque converter then acts as a brake. When the torque converter is used as a brake, the turbine 13 acts as a rotor. The stator 14 is mounted on the hollow shaft 19 by means of an overrunning clutch including a single freewheel 16 which allows the stator to rotate in a single direction. The casing 11 is further connected with a spur gear 18 which can transmit torque to one or more auxiliary units, such as an oil pump (not shown).

The torque converter further comprises a second friction clutch 26 which is installed between the casing 11 and the turbine 13, i.e., between the input member 10 and the output member 20. The second friction clutch 26 serves as a means for bypassing the actual torque converter during traction operation at a higher speed and is engaged during braking so that the prime mover 1 which drives the input member 10 participates in the braking action. The clutch 26 can be provided in addition to or as a substitute for a freewheel 27 which is also installed between the input member 10 and the output member 20 and serves to insure that the speed of the output member 20 can equal or is less than but cannot exceed the speed of the input member 10. The freewheel 27 is active during braking, for example, also in the event when the friction clutch 26 becomes disengaged in automatic response to a reduction of RPM below a predetermined value. Moreover, the freewheel 27 constitutes a parking brake by preventing rotation of the output member 20 when the input member 10 is idle.

An important advantage of the improved torque converter is that it can be used as a braking device in such a way that the prime mover 1 (e.g., an engine) which drives the input member 10 participates in the braking action. Another important advantage of the torque converter is that it can employ a friction brake and friction clutches which are smaller than those in conventional torque converters (see particularly the German Offenlegungsschrift No. 1,919,983).

The just outlined advantages are achieved by the provision of the friction brake 24 which is shown as being mounted on or in the stationary housing 25 and serves to brake the pump 12 when the friction clutch 23 is disengaged, and by the provision of the overrunning clutch 16 which confines the stator 14 to rotation in a single direction relative to the hollow supporting shaft 19. During braking, the pump 12 acts as a stator and the turbine 13 acts as a rotor; this is in direct contrast to the mode of operation of the torque converter which is disclosed in the German Offenlegungsschrift No. 1,919,983. Consequently, the turbine 13 can be permanently connected with the output member 20 so that there exists no need for the provision of a friction clutch or a freewheel at the locus of maximum torque during starting of a vehicle. All that is necessary is to provide a relatively small friction brake 24 in addition to the customary friction clutch 23 and to use the brake 24 as a means for braking the pump 12 when the clutch 23 is disengaged. The advantages of the improved torque converter and its friction brake will be more readily appreciated by considering that the direction of fluid flow is reversed in response to shifting from normal operation (traction) to braking. Consequently, when the torque converter acts as a brake, the stator 14 is free to rotate (see the freewheel 16) to thereby prevent any alteration of the torque transmitted from the rotor (turbine 13) to the stator (pump 12) in the course of a braking operation. A stator (14) which can rotate during braking exhibits the additional advantage that the braking moment acting on the turbine 13 during braking is much higher than in torque converters with fixedly mounted stators. This is attributed to the fact that the freely rotatable stator 14 does not act as a throttle or flow restrictor for fluid which circulates in the enclosure A.

In the embodiment of FIG. 1, the hollow supporting shaft 19 surrounds a portion of the output member 20. It is clear, however, that the torque converter can be modified by mounting the input member 10 in such a way that it extends through the supporting means for the stator 14. The mounting of the input member 10 and/or the output member 20 in the supporting member 19 renders it possible to make the axes of the members 10, 20 coincide with the axis of the stator 14 and to simplify the construction and/or mounting of these members. In presently known torque converters which employ a centrally located supporting shaft for the stator, the input member and/or the output member is a hollow shaft or sleeve which surrounds the supporting member for the stator and must be connected with the prime mover or with the mechanical gear train by means of gears, belts or like torque transmitting parts.

Still another important advantage of the improved torque converter is that, when the output member 20 is used to drive the input element of the change-speed transmission 2, the shifting of transmission 2 into a different gear is facilitated by the simple expedient of temporarily applying the friction brake 24 with simultaneous temporary disengagement of the friction clutch 23. This will be readily appreciated by considering that a short-lasting braking of the pump 12 entails a substantial deceleration of the turbine 13 and output member 20 as is necessary for shifting from a higher to a lower transmission ratio. Rapid deceleration of the turbine 13 for such type of shifting can be achieved if the inertia of masses which rotate with the turbine is rather low. In other words, and in contrast to the construction of many conventional torque converters, the turbine 13 should be capable of rotating independently of the relatively large bulky and heavy casing 11. Also, the casing 11 should be capable of rotating relative to the bladed components 12–14 of the torque converter but should be rigid with the input member 10 so that it can drive the pump 12 by way of the friction clutch 23 in normal operation (traction) of the automotive vehicle.

Still another advantage of the improved torque converter is that it can dispense with a clutch between the output member 20 and the input element of the change-speed transmission 2. Such clutches are needed in conventional combinations of torque converters with change-speed transmissions being of that type which may only be changed over when the torque transmission is interrupted. The clutch must there be disengaged prior to each shifting into a different gear.

The means for actuating the friction brake 24 and the friction clutches of the improved torque converter may comprise a pedal if the shifting into a different gear is to be performed by hand, and an automatic control system if the shifting is to be effected in accordance with a predetermined program. If the actuating means comprises a pedal, initial movement of the pedal from its idle or starting position preferably results in disengagement of the friction clutch 23, for example, in such a way that the forces between the driving and driven parts of the clutch 23 decrease gradually in response to progressive displacement of the pedal from its starting position. The friction brake 24 is engaged during the next stage of movement of the pedal from its starting position, preferably in such a way that the braking action increases proportionally with the extent of movement of the pedal from its starting position. Thus, the first stage of movement of the pedal gradually interrupts the traction, and the next-following stage results in gradual deceleration of the turbine 13. If the torque converter employs a further clutch which is installed directly between the input member 10 and the output member 20 and is engaged in normal operation, the further clutch is also disengaged simultaneously with the friction clutch 23.

The braking action of the improved torque converter is preferably initiated by a second pedal (brake pedal) or by a separate lever (e.g., a manually operable lever). Such brake pedal or lever can simultaneously serve to apply one or more conventional friction brakes and to change the fluid pressure in the torque converter in a manner known per se to thereby select the desired braking moment.

An advantage of such mounting of the friction brake 24 that its parts are located outside of the enclosure A is that the brake 24 causes negligible losses in output during normal operation of the vehicle because its rotary parts are surrounded by air rather than by a liquid medium. On the other hand, the mounting of the friction brake 24 outside of the casing 11 results in a certain increase of the overall length of the torque converter, as considered in the axial direction of the members 10 and 20.

The vanes or blades of the stator 14 are preferably adjustable. This renders it possible to adjust the torque which is being transmitted in normal operation (traction) as well as during braking. The exact manner in which the vanes of the stator 14 are adjustable forms no part of the present invention.

The stator 14 is located downstream of the turbine 13, as considered in the direction of circulation of fluid through the bladed components of the torque converter during normal operation (traction), and the flow of fluid takes place essentially in the axial direction of the stator.

The friction clutch 26 is engaged during braking and thereby insures that the prime mover 1 which rotates the input member 10 participates in the braking action. The clutch 26 can be made much smaller than the corresponding clutch of the torque converter which is disclosed in the German Offenlegungsschrift No. 1,919,983. This is due to the fact that, during braking, the clutch 26 must transmit only that torque which is being taken up by the prime mover 1. As mentioned before, the clutch 26 can be provided in addition to or as a substitute for the freewheel 27 which prevents the output member 20 from rotating at a speed exceeding that of the input member 10. The freewheel 27 establishes a direct mechanical connection between the members 10 and 20 only during braking and when the vehicle which embodies the torque converter is parked. The provision of the friction clutch 26 and/or freewheel 27 is desirable in vehicles which are used in construction industry (such as tractors, bulldozers and heavy-duty trucks), fork lift trucks, other types of vehicles for the transport of goods, and also in passenger vehicles whenever one desires to insure a soft change in torque in the entire speed range, i.e., when the torque converter is in continuous use.

If the friction clutch 26 is of the type which is disengaged in automatic response to a reduction of RPM below a predetermined value, it is preferably provided in addition to the freewheel 27 which latter then acts as a parking brake because the clutch 26 is disengaged when the vehicle is at a standstill. Also, the freewheel 27 then insures that the prime mover 1 participates in the braking action if such action takes place while the clutch 26 is disengaged.

Figure 2:
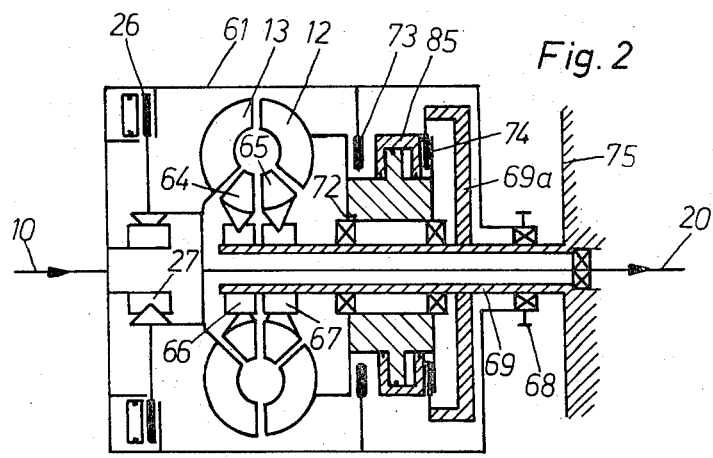
FIG. 2 is a similar axial sectional view of a second torque converter.

The hydrodynamic torque converter of FIG. 2 also comprises an input member 10 which is coaxial with an output member 20, a rotary casing 61 which is rigid with the input member 10, a friction clutch 26 between the turbine 13 and the casing 61, and a pump 12. In contrast to the structure which is shown in FIG. 1, the stator means of the torque converter of FIG. 2 comprises two discrete stators 64 and 65. The pump 12 is rigid with a hollow shaft 72 which surrounds a hollow stationary supporting shaft 69 for the stators 64, 65. The friction clutch 73 corresponds to the friction clutch 23 of FIG. 1 and the friction brake 74 corresponds to the friction brake 24 with the exception that the brake 74 is mounted in the fluid enclosure defined by the casing 61. The stationary housing is shown at 75. The supporting shaft 69 has a flange 69a which is located in the enclosure of the casing 61 and supports the brake 74. The clutch 73 is disengaged during braking, i.e., when the brake 74 is operative. The reference characters 66 and 67 denote two discrete freewheels which are respectively interposed between the stators 64, 65 and the hollow supporting shaft 69. The gear 68 receives torque from the casing 61 and can be used to drive one or more auxiliary units, such as the aforementioned oil pump.

The purpose of the friction clutch 26 and freewheel 27 is the same as that of the similarly referenced parts in the torque converter of FIG. 1.

As mentioned before, one of the differences between the torque converters of FIGS. 1 and 2 is that the brake 74 is mounted in the enclosure of the casing 61 and is closely adjacent to the clutch 73. Therefore, the devices 73, 74 can employ a common piston 85 which is a twin piston serving to engage the clutch 73 in one end position and to actuate the brake 74 in the other end position.

Since the friction brake 74 is installed in the casing 61, its stationary parts offer a certain resistance to circulation of fluid in the fluid enclosure when the torque converter operates normally; however, the overall length of this torque converter is less than that of the torque converter shown in FIG. 1. Moreover, and as mentioned above, the piston 85 can form part of the friction clutch 73 as well as the friction brake 74. It is clear that the common piston 85 can be replaced by two discrete pistons which are mechanically coupled to each other.

Figure 3:
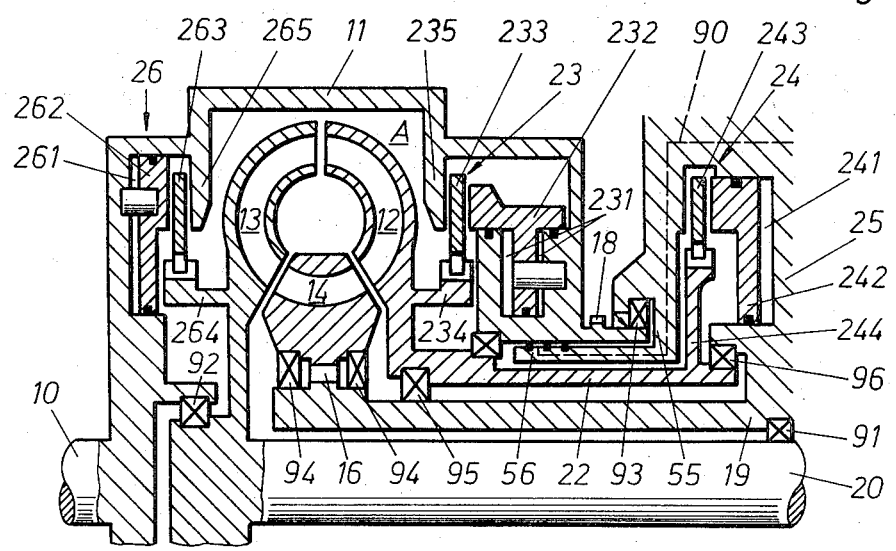
FIG. 3 is a more detailed fragmentary axial sectional view of a third torque converter which constitutes a slight modification of the torque converter shown in FIG. 1.

The torque converter of FIG. 3 is quite similar to that of FIG. 1 and, therefore, all such parts thereof which are identical with or clearly analogous to the corresponding parts of the first torque converter are denoted by similar reference characters. The input member 10 is rigid with the casing 11 which defines behind the turbine 13 a cylinder chamber 261 for the piston 262 of the friction clutch 26. The disc 263 of the clutch 26 is pressed against a ring-shaped backing plate 265 of the casing 11 when the cylinder chamber 261 receives pressurized fluid whereby the casing 11 is coupled to a cylindrical extension 264 of the turbine 13. The extension 264 has one or more axially parallel teeth which mate with complementary teeth of the clutch disc 263 so that the latter is movable axially toward and away from the backing plate 265.

The output member 20 is rigid with the turbine 13 and is rotatably mounted in the stationary housing 25 (see the antifriction bearing 91) and in the casing 11 (see the antifriction bearing 92). Both axial ends of the casing 11 are rotatably journalled in the housing 25. The drawing merely shows an antifriction bearing 93 which is interposed between the right-hand end portion of the casing 11 and a radially inwardly extending portion 55 of the housing 25.

The friction clutch 23 is mounted rearwardly of the pump 12 in the fluid enclosure A of the casing 11. This clutch comprises two cylinder chambers 231, a double-acting piston 232 between the chambers 231, a disc 233, and a ring-shaped backing plate 235. The disc 233 has an internal gear whose teeth mate with the teeth on a cylindrical extension 234 of the pump 12.

The brake 24 is built into the stationary housing 25 and comprises a cylinder chamber 241, a piston 242 and a disc 243 having an internal gear whose teeth mate with the teeth of a flange 244 of the hollow shaft 22 for the pump 12. When the chamber 241 receives pressurized fluid, the piston 242 presses the disc 243 against the housing portion 55 which constitutes a backing plate of the clutch 24.

The hollow supporting shaft 19 is rigid or integral with the housing 25 and surrounds the output member 20. The stator 14 is mounted on the inner end portion of the supporting shaft 19 by means of two antifriction bearings 94. The freewheel 16 of the overrunning clutch for the stator 14 is disposed between the bearings 94. The hollow shaft 22 for the pump 12 is rotatable on a first antifriction bearing 95 which surrounds the supporting shaft 19 and in a second antifriction bearing 96 which is installed in the housing 25. The housing portion 55 extends between the clutch 24 and the adjacent end portion of the casing 11; this housing portion has a tubular element here shown as a cylindrical sleeve 56 which surrounds the hollow shaft 22 and extends inwardly toward the cylinder chambers 231. The housing portion 55 and its sleeve 56 can be provided with channels or analogous passages (indicated by a broken line 90) for the admission of pressurized fluid to as well as for the evacuation of fluid from the cylinder chambers 231.

The terms "input means" and "output means" which are used in the claims are intended to embrace shafts, flanges, sleeves and/or other rotary parts which can transmit torque from the prime mover 1 to the casing of the torque converter and from the turbine to the input element of the change-speed transmission 2 or another mechanical gear train.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by letters Patent is set forth in the appended claims.

1. In a hydrodynamic torque converter, the combination of rotary input means; a rotary casing rigid with said input means and defining a fluid enclosure; a pump mounted in said enclosure and rotatable independently of said casing; first clutch means engageable to couple said pump to said casing; a turbine mounted in said enclosure and rotatable independently of said casing; rotary output means rigid with said turbine; rotary stator means provided in said enclosure; a housing including hollow stationary supporting means for said stator means, one of said input and output means being surrounded by said supporting means; mechanical brake means mounted in said housing and operable to oppose the rotation of said pump in disengaged condition of said first clutch means; and overrunning clutch means interposed between said supporting means and said stator means to confine said stator means to rotation in a single direction relative to said housing.

2. The combination of claim 1, wherein said first clutch means comprises a friction clutch mounted in said enclosure and said casing is rotatable independently of said stator means, said pump having vanes positioned for substantially centrifugal flow of fluid through said pump and said turbine having vane means positioned for substantially centripetal flow of fluid through said turbine during normal operation of the torque converter (traction).

3. The combination of claim 1, wherein said mechanical brake means comprises a friction brake installed in said housing outside of said enclosure.

4. The combination of claim 1, wherein said mechanical brake means comprises a friction brake installed in said enclosure.

5. The combination of claim 4, wherein said friction brake is mounted on said supporting means of said housing.

6. The combination of claim 4, wherein said friction brake and said first clutch means comprise at least one common component.

7. The combination of claim 1, wherein said stator means comprises adjustable vane means.

8. The combination of claim 1, wherein said stator means comprises a plurality of discrete stators and said overrunning clutch means comprises a discrete freewheel for each of said stators.

9. The combination of claim 8, wherein said stator means comprises two stators.

10. The combination of claim 1, wherein said stator means is located downstream of said turbine, as considered in the direction of fluid flow through the bladed components of the torque converter during its normal operation (traction).

11. The combination of claim 10, wherein said stator means comprises vane means positioned for substantially axial flow of fluid through said stator means.

12. A combination of claim 1, further comprising means for mechanically coupling said output means to said input means.

13. The combination of claim 12, wherein said means for mechanically coupling is located in said enclosure, said turbine being disposed between said means for mechanically coupling and said pump.

14. The combination of claim 12, wherein said means for mechanically coupling comprises a friction clutch.

15. The combination of claim 14, wherein said means for mechanically coupling further comprises a freewheel arranged to prevent rotation of said output means at a speed exceeding the speed of said input means.

16. The combination of claim 12, wherein said means for mechanically coupling comprises a freewheel arranged to prevent rotation of said output means at a speed exceeding the speed of said input means.

17. The combination of claim 1, further comprising a hollow shaft rigid with said pump and rotatably surrounding said supporting means, said housing further comprising a tubular portion surrounding said hollow shaft and provided with passage means for conveying a fluid medium to and from said first clutch means.

18. The combination of claim 17, wherein said first clutch means comprises a backing member on said casing, a disc movable axially of said shaft and arranged to rotate with said pump, a piston mounted in said casing and movable axially in response to admission of pressurized fluid by way of said passage means to thereby urge said disc against said backing member.

19. The combination of claim 1, wherein said input means is coaxial with said output means.

* * * * *